(12) United States Patent
McCann et al.

(10) Patent No.: US 11,039,374 B2
(45) Date of Patent: Jun. 15, 2021

(54) INDICATING SUPPORT FOR A BROADCAST SERVICE

(71) Applicant: BlackBerry Limited, Waterloo (CA)

(72) Inventors: Stephen McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 33 days.

(21) Appl. No.: 16/124,847

(22) Filed: Sep. 7, 2018

(65) Prior Publication Data

US 2020/0084696 A1    Mar. 12, 2020

(51) Int. Cl.
*H04W 4/00* (2018.01)
*H04W 48/10* (2009.01)
*H04W 48/14* (2009.01)
*H04W 48/16* (2009.01)
*H04W 84/12* (2009.01)

(52) U.S. Cl.
CPC ............ *H04W 48/10* (2013.01); *H04W 48/14* (2013.01); *H04W 48/16* (2013.01); *H04W 84/12* (2013.01)

(58) Field of Classification Search
USPC ....... 370/312, 230, 252, 311, 329, 336, 338, 370/342
See application file for complete search history.

(56) References Cited

U.S. PATENT DOCUMENTS

| | | | | |
|---|---|---|---|---|
| 9,814,085 | B2* | 11/2017 | Cherian | H04W 76/00 |
| 2007/0242695 | A1 | 10/2007 | Xu | |
| 2008/0049703 | A1* | 2/2008 | Kneckt | H04W 68/00 370/342 |
| 2008/0181161 | A1* | 7/2008 | Gi Kim | H04W 72/005 370/312 |
| 2017/0164372 | A1* | 6/2017 | Gupta | H04W 24/08 |

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.
CISCO Public, Technical white paper, IEEE 802.11ax: The Sixth Generation of Wi-Fi, 2018 (15 pages).
Morioka, Hitoshi, Broadcast Service on WLAN, IEEE 802.11-17/1736r4, Jan. 2018 (22 pages).
McCann, Stephen, BCS Problem Statement, IEEE 802.11-18/0972r0, May 2018 (13 pages).
European Patent Office, International Search Report and Written Opinion for PCT/EP2019/071862 dated Nov. 18, 2019 (14 pages).
McCann, Stephen, Submission—IEEE 802.11-18/1091r0, P802.11aq Broadcast Features, Jun. 2018 (6 pages).
Onoue, Yasuhiko, NTT, Submission—IEEE 80211-17/0561r0, Some Use Cases for Broadcast Services over WLAN, Mar. 2018 (9 pages).

* cited by examiner

*Primary Examiner* — Phuongchau Ba Nguyen
(74) *Attorney, Agent, or Firm* — Trop, Pruner & Hu, P.C.

(57) ABSTRACT

A source wireless device sends an indication of support for one or more broadcast services that broadcasts information over a wireless local area network (WLAN).

19 Claims, 4 Drawing Sheets

US 11,039,374 B2

INDICATING SUPPORT FOR A BROADCAST SERVICE

BACKGROUND

Electronic devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

Wireless devices, including user devices or other endpoint devices, APs, and/or other devices, can perform various different types of communications, based on capabilities of the devices. In some cases, it may be difficult to determine whether devices are able to support specific types of communications.

BRIEF DESCRIPTION OF THE DRAWINGS

Some implementations of the present disclosure are described with respect to the following figures.

Figure 1:
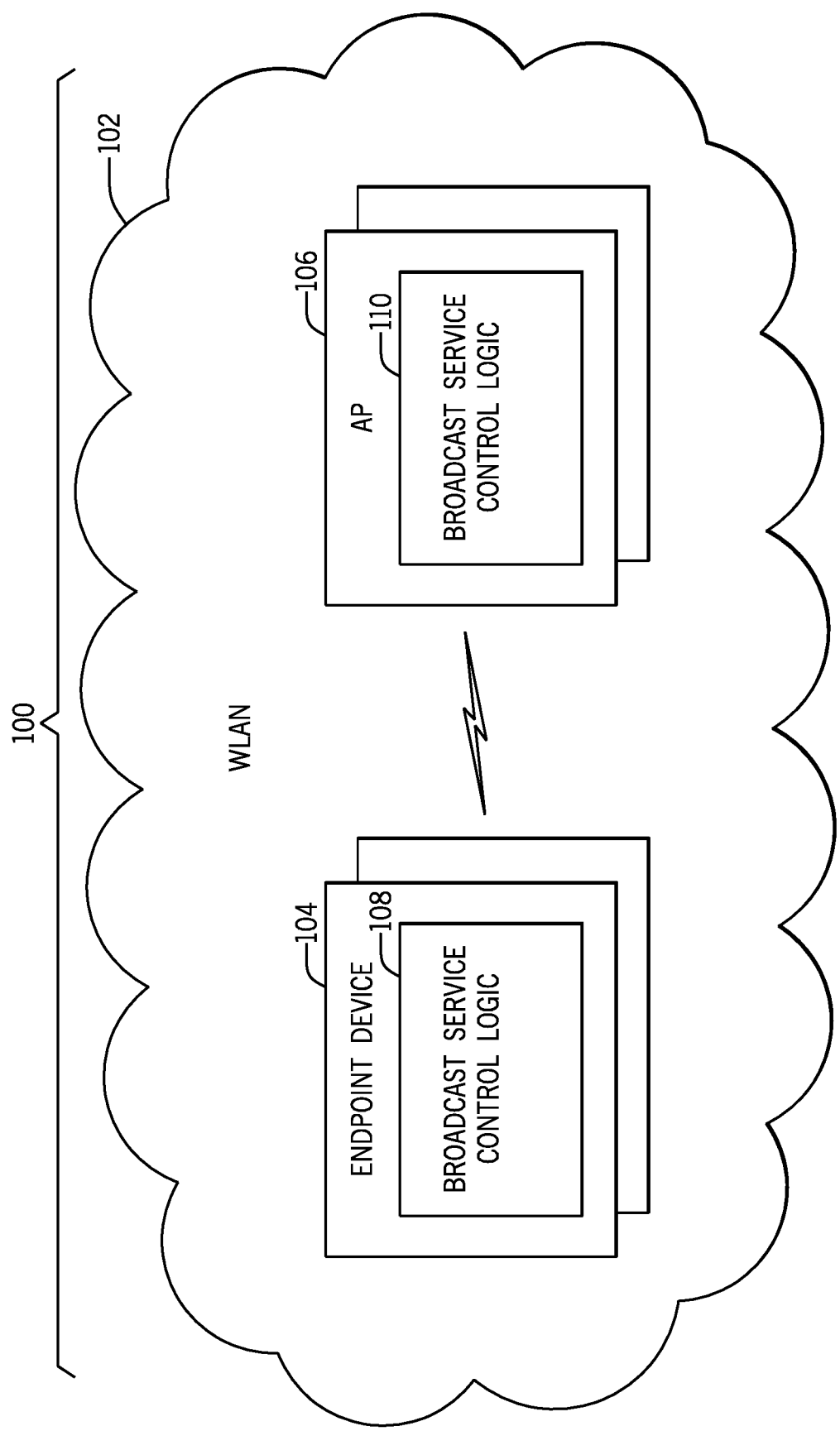
FIG. 1 is a block diagram of an example network arrangement according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a wireless local area network (WLAN), an endpoint device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications.

Examples of endpoint devices include computers (e.g., tablet computers, notebook computers, desktop computers, server computers, etc.), handheld devices (e.g. smart phones, personal digital assistants, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (IoT) devices, roadside units (RSUs) (such as devices in traffic lights, traffic signs, etc., that are able to transmit information to vehicles or other devices), storage devices, communication nodes, or other types of endpoint or user devices that are able to communicate wirelessly. Endpoint devices can include mobile devices and/or fixed position devices. More generally, an endpoint device can refer to an electronic device that is able to communicate wirelessly.

An IEEE 802.11 Broadcast Services (BCS) study group is studying the broadcasting of various types of information by devices (e.g., stations) that are able to communicate according to IEEE 802.11. As used here, "broadcasting" information can refer to the transmission of the information to any multiple devices that are in a network or within range. In other examples, "broadcasting" information can refer to multicasting the information to a specified group of devices, where devices outside this group do not receive the multicast information.

The broadcasting of information according to "broadcast services" refers to broadcasting information that may be different from control information used for associating a device with a network or establishing a connection with a network. For example, broadcasting of information according to "broadcast services" can refer to broadcasting data, such as user data, application program data, vehicle-related data (e.g., data relating to vehicles, vehicular traffic, road conditions, etc.), and/or other types of data.

The following are some examples of broadcast services.

A downstream broadcast service involves a source wireless device (e.g., an AP or other wireless device) broadcasting information to any device capable of receiving the information. The information may be secured, so that only devices with an established security relationship to the source wireless device can correctly decode the information. Example use cases of downstream broadcast services include any or some combination of the following: live streaming of data, advertisements (such as of services or products or other information), billboards, emergency information, and so forth.

A vehicular broadcast service involves a source wireless device (e.g., a roadside unit or RSU, a vehicle, or other wireless device) broadcasting information to any device capable of receiving the information. The vehicular broadcast service differs from the downstream broadcast service in that either the source or receiving wireless device may be moving at high speed relative to each other. Example use cases include any or some combination of advanced railroad grade crossing, broadcast traveler information, and so forth.

An uplink broadcast service involves a source wireless device (e.g., a sensor or other wireless device) broadcasting information (in an uplink) to any device capable of receiving the information. The uplink broadcast service differs from the downstream broadcast service or the vehicular broadcast service as the source wireless device may be a transmit-only device and have restricted capabilities (e.g., the source wireless device can include an IoT device, etc.). Example use cases include transmission of sensor data and so forth.

Prior to association, an IEEE 802.11 receiving wireless device (e.g., a station) cannot quickly determine if another device (e.g., an AP or WLAN-enabled sensor) has a broadcast service. In a WLAN according to IEEE 802.11, association between a wireless device and the WLAN refers to the establishment of a connection between the wireless device and an AP of the WLAN. A "pre-associated state" of a wireless device refers to a state of the wireless device before the wireless device has established a connection with a network. This state is also referred to as the unassociated state or State 1.

In the pre-associated state, if the receiving wireless device receives broadcast information, the receiving wireless device cannot determine if the broadcast information is a short broadcast of control information including WLAN signaling (e.g., control information regarding supported authentication schemes of an AP), or if the broadcast information is according to a broadcast service from a broadcast device (e.g. an AP, a sensor, an RSU, or another wireless device) that supports the broadcast service capability.

In accordance with some implementations of the present disclosure, a source wireless device is able to send an indication of support for one or more broadcast services, where each broadcast service broadcasts information over a WLAN.

FIG. 1 is a block diagram of an example network arrangement 100 that includes a WLAN 102. The WLAN 102 includes an AP 106 with which an endpoint device 104 is able to wirelessly communicate. The WLAN 102 can include multiple APs, and there may be multiple endpoint devices to communicate with the one or more APs of the WLAN 102.

In some examples according to FIG. 1, the AP 106 can be a source wireless device that is able to broadcast information according to a broadcast service, and the endpoint device 104 can be a receiving wireless device to receive broadcast information according to the broadcast service. In other examples, the endpoint device 104 can be a source wireless device that can send broadcast information according to a broadcast service to the AP 106.

In further examples, another wireless device (not shown) can be coupled to the WLAN 102 that can act as a transmitting wireless device or a receiving wireless device to communicate broadcast information according to a broadcast service with either the endpoint device 104 or the AP 106.

As shown in FIG. 1, an endpoint device 104 includes a broadcast service control logic 108 that is able to control functionalities of the endpoint device 104 related to communication using a broadcast service. Similarly, the AP 106 includes a broadcast service control logic 110 that controls functionalities of the AP 106 relating to communication according to a broadcast service.

As used here, a "logic" can refer to a hardware processing circuit, which can include any or some combination of a microprocessor, a core of a multi-core microprocessor, a microcontroller, a digital signal processor, a programmable integrated circuit, a programmable gate array, or another hardware processing circuit. Alternatively, a "logic" can refer to a combination of a hardware processing circuit and machine-readable instructions (software and/or firmware) executable on the hardware processing circuit.

Figure 2:
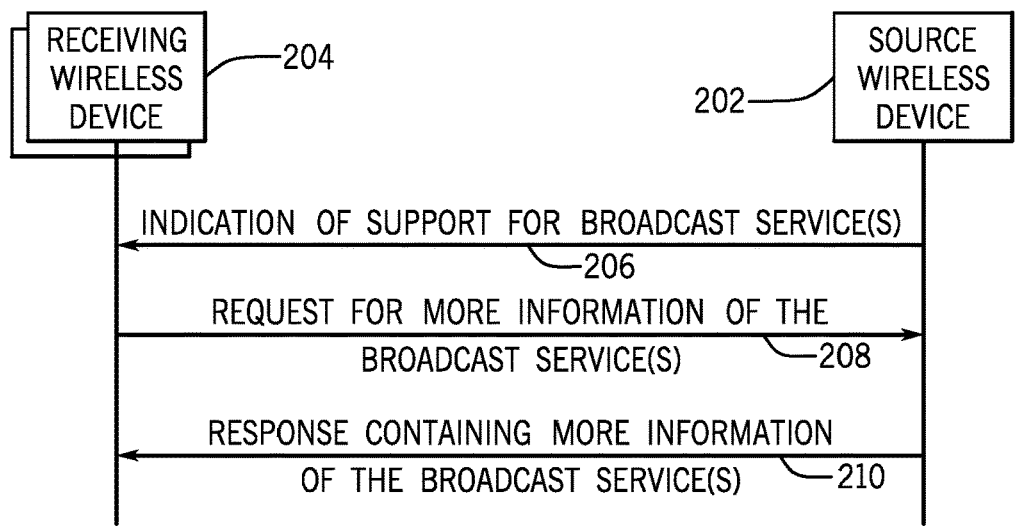
FIGS. 2-4 are message flow diagrams of messages exchanged between receiving and source wireless devices, according to some implementations.

FIG. 2 is a message flow diagram that shows messages that can be exchanged between a source wireless device 202 and one or more receiving wireless devices 204 to enable communications according to one or more broadcast services. As shown in FIG. 2, the source wireless device 202 sends (at 206) an indication of support for a broadcast service(s).

The indication of support for broadcast service(s) (hereinafter "broadcast service indication") can be in the form of an information element (e.g., a multi-bit field or a single bit) advertising that the source wireless device 202 can provide a broadcast service (or multiple broadcast services). A supported broadcast service can include any of the following scenarios: (1) multiple source wireless devices transmitting to one receiving wireless device; (2) a single source wireless device and multiple receiving wireless devices; or (3) multiple source wireless devices and multiple receiving wireless devices.

The broadcast service indication can be included in any of various different messages. For example, the broadcast service indication can be included in a beacon that is transmitted by the source wireless device 202 (e.g., an AP) for receipt by multiple wireless devices within a wireless communication range of the AP. A beacon from an AP can include a Service Set Identifier (SSID) of the AP, to identify the WLAN 102. The beacon can also include other information, which according to some implementations of the present disclosure include the broadcast service indication. A beacon is a type of an IEEE 802.11 management frame. In other examples, another type of an IEEE 802.11 management frame can be used to carry the broadcast service indication.

In other examples, the broadcast service indication can be included in a response message, such as a Probe response message, an Access Network Query Protocol (ANQP) response message, and so forth.

A Probe response according to IEEE 802.11 is a response to a Probe request sent by the endpoint device (e.g., 204 in FIG. 2). A Probe request can be transmitted by an endpoint device for receipt by one or more APs within the range of the wireless device. The Probe request is used by the endpoint device to discover AP(s) within the wireless communication range of the endpoint device.

ANQP is a type of an advertisement protocol. ANQP operates as a simple request and response protocol that is used by a device to discover a range of information from an "Access Network Information" (ANI) server. This ANI server is either co-located with an AP or is located within a LAN, which is the layer 2 network to which the AP is connected. ANQP allows a device to determine the properties of the LAN before starting an association procedure.

In other examples, the broadcast service indication sent (at 206) can be included in another message.

In addition to transmitting a broadcast service indication to advertise support for a broadcast service (or multiple broadcast services), other signaling indications can be provided to allow further capabilities relating to broadcast services. For example, other signaling indications exchanged between an IEEE 802.11 receiving wireless device and an IEEE 802.11 source wireless device can include any or some combination of the following: an indication from a receiving wireless device to request a source wireless device for information of characteristics and the state of available broadcast service(s); an indication used by a receiving wireless device ability to initiate and terminate on-demand broadcast service(s) of a source wireless device; an indication used by a receiving device to join an in-progress broadcast service of a source wireless device; an indication sent by a source wireless device to return the characteristics and state of broadcast service(s) supported by the source wireless device, and so forth.

For example, a receiving wireless device (that is transmit-capable) can send an indication to a source wireless device requesting information of further details (e.g., characteristics and/or state) of a broadcast service(s), and in response, the source wireless device (which is receive-capable) responds with an indication containing the requested information.

As further shown in FIG. 2, additional optional messages 208 and 210 can be exchanged between the source and receiving wireless devices 202 and 204. An individual receiving wireless device 204 that desires to obtain further detail about a broadcast service(s) can send (at 208) a request for more information about the broadcast service(s).

Protocols and elements used for this request are explained further below.

In response to the request for more information about the broadcast service(s), the source wireless device 202 sends (at 210) a response containing the more information about the broadcast service(s). Examples of information included in the response can include any or some combination of the following: a number of broadcast stream(s) the source wireless device has available, channels (or sub-channels) on which the broadcast stream(s) is (are) broadcast, time and availability of the broadcast stream(s), whether security is provided on the broadcast stream(s), and so forth.

A "broadcast stream" refers to a stream of broadcast information that is separately identifiable (by an identifier) from another broadcast stream. A broadcast service can include one or more broadcast streams that can be broadcast by a source wireless device.

Figure 3:
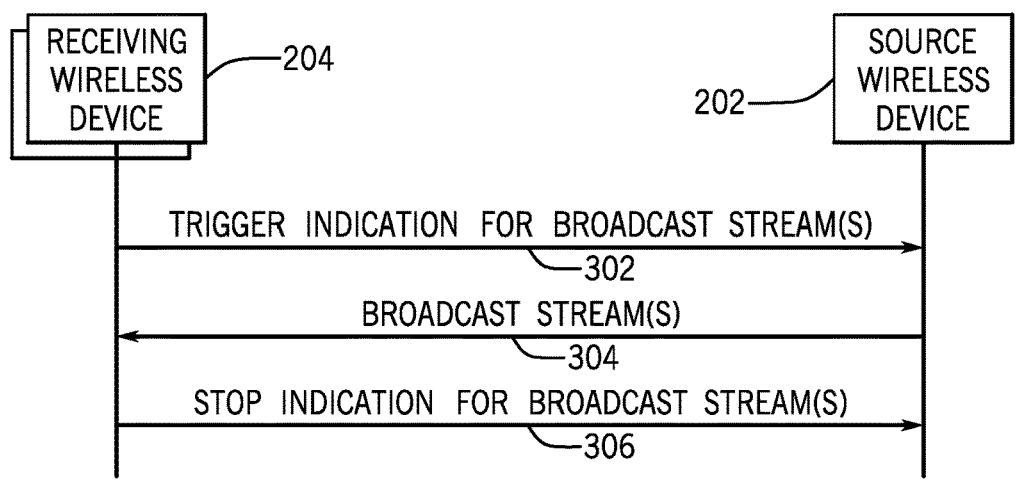

FIG. 3 is a message flow diagram of example messages to allow a receiving wireless device 204 to control a broadcast stream(s) from a source wireless device that is capable of being controlled by a receiving wireless device in the delivery of a broadcast service. FIG. 3 assumes that the source and receiving wireless devices 202 and 204 are each capable of transmitting and receiving.

A receiving wireless device 204 sends (at 302) a trigger indication to trigger the source wireless device 202 to broadcast a broadcast stream (or multiple broadcast streams) identified in the trigger indication. For example, the trigger indication (which can be included in a message) can include an identifier of a specified broadcast stream (e.g., broadcast stream n) or identifiers of multiple broadcast streams. The trigger indication indicates to the source wireless device 202 that the source wireless device 202 can start to broadcast information of the identified broadcast stream(s). If several broadcast streams are available, then the individual receiving wireless device 204 can indicate which broadcast stream(s) the receiving wireless device 204 wants to receive.

In response to the trigger indication, the source wireless device 202 broadcasts (at 304) the broadcast stream(s) indicated by the trigger indication. The trigger indication 302 can also be called a subscription request to request device 202 to begin broadcasting the requested broadcast stream 304.

In some examples, the source wireless device 202 can determine, based on one or more factors, whether a broadcast stream (as opposed to a unicast stream) should be used. This determination can be made based on any or some combination of the following factors: how many receiving wireless devices 204 are connected to the source wireless device 202, how many of the receiving wireless devices 204 have requested broadcast stream(s) (for example by sending trigger indication 302), and what the capability of the backhaul communication link of the source wireless device is.

The source wireless device 202 can dynamically adjust how many broadcast streams are being transmitted at any given time. For example, if five broadcast streams are currently being transmitted, then the source wireless device 202 can advertise that the source wireless device 202 supports more than five broadcast streams. In such a scenario, an individual receiving wireless device 204, which receives the advertise, can then request the source wireless device 202 (e.g., using the request sent at 208 in FIG. 2) for more information of the broadcast streams. Subsequently, the individual receiving wireless device 204 can request that the source wireless device 202 start to transmit another broadcast stream (such as by using the trigger indication 302 in FIG. 3).

An individual receiving device 204 can further send (at 306) a stop indication to stop the broadcast of one or more broadcast streams. In response to the stop indication, the source wireless device 202 can determine whether this is reasonable based on the number of active receiving wireless devices that the source wireless device 202 knows are receiving the one or more broadcast streams. If the source wireless device 202 determines that there are zero (for example) receiving wireless devices receiving a given broadcast stream after satisfying the stop indication, the source wireless device 202 can stop transmitting the given broadcast stream.

Note that if the source wireless device 202 determines that there is just one receiving wireless device receiving a given broadcast stream after satisfying the stop indication, then the source wireless device 202 can decide to unicast the stream.

More generally, an individual receiving wireless device 204 can send an indication to control (e.g., start, stop, or some other control action) a broadcast service of a source wireless device.

Figure 4:
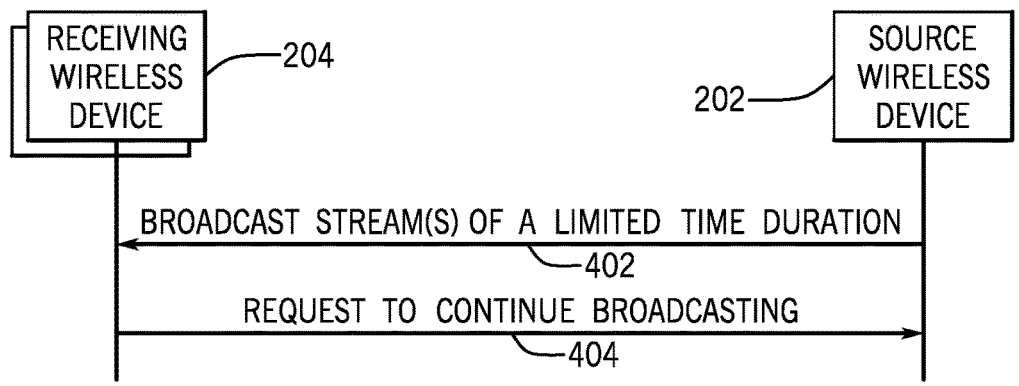
Figure 6:
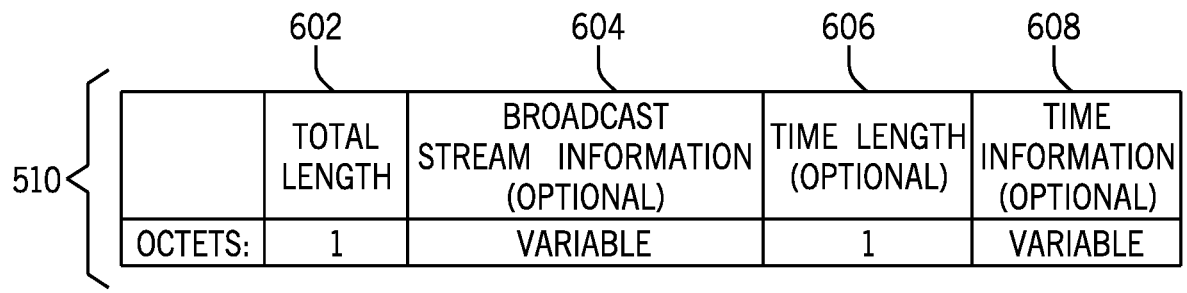

FIG. 4 is a message flow diagram of example messages related to broadcast stream(s) that is (are) broadcast (at 402) for a limited time duration(s). FIG. 6 assumes that the source and receiving wireless device 202 and 204 are each capable of transmitting and receiving.

Information indicating that a given broadcast stream has a limited time duration can be transmitted at 210 in FIG. 2, for example.

If an individual receiving wireless device 204 desires that the source wireless device 202 continue to broadcast one or more broadcast streams past the respective limited time duration(s), the individual receiving wireless device 204 can send (at 404) a request to the source wireless device 202 to continue broadcasting the one or more broadcast streams past the respective limited time duration(s).

If the source wireless device 202 determines that there is just one receiving wireless device making the request (at 404) to continue broadcasting, then the source wireless device 202 may decide to transmit the stream in a unicast mode to that receiving wireless device.

Note that the request sent at 404 can also be transmitted from an individual receiving wireless device 204 to the source wireless device 202, if the source wireless device 202 has advertised a broadcast service capability (using the broadcast service indication sent at 206 in FIG. 2), but the source wireless device 202 is not currently broadcasting any information. This may be because the source wireless device 202 has determined that the source wireless device 202 currently has no receiving wireless devices to which the information is to be transmitted.

The following describes examples of various indications or messages discussed above.

Broadcast Capability ANQP-Element

Figure 5:
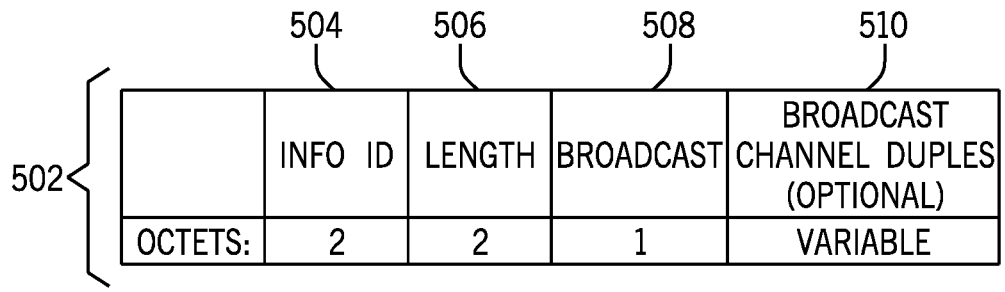
FIGS. 5-9 are block diagrams of formats of elements carrying information relating to broadcast services, according to some implementations.

FIG. 5 shows an example of indications or messages (sent at 206, 208, and 210 in FIG. 2), in the form of a Broadcast Capability ANQP-element 502. The Broadcast Capability ANQP-element 502 has an INFO ID field 504, a LENGTH field 506, a BROADCAST field 508, and optional BROADCAST CHANNEL duple(s) 510. Example sizes (in octets) of the respective fields are also indicated in FIG. 5.

The INFO ID field 504 is set to a specified value to indicate that the ANQP-element 502 is a Broadcast Capability ANQP-element.

The LENGTH field 506 has a value set to the length of the fields 508 and 510.

The BROADCAST field 508 can be set to any of various values to advertise respective different information. Examples of such values and what they represent are shown below in Table 1.

TABLE 1

| BROADCAST field value | Description of Broadcast Capability |
|---|---|
| 0 | No Broadcast Capability |
| 1 | Dedicated Broadcast Service indicated by each BROADCAST CHANNEL duple, which contains information of a broadcast stream on a broadcast channel |
| 2 | Transmit an element to start/stop broadcast service [on broadcast channel 'n'] |
| 3 | Many broadcast channels supported, send specific request element for more information |
| 4 | Transmit Only Device |
| 4-220 | Reserved |
| 221 | Vendor Specific Broadcast Service |
| 222-256 | Reserved |

Setting the BROADCAST field value to "0" may be used if the broadcast service capability in the WLAN is dynamic, for example, if the broadcast service capability is only used when the WLAN is heavily loaded with traffic and devices. Value "0" would indicate that the broadcast capability is currently switched off.

Setting the BROADCAST field value to "4" to indicate "Transmit Only Device" can be used when this information is present in a beacon frame from the source wireless device 202. In some examples, the "Transmit Only Device" information would not be expected to be transmitted within an ANQP or probe request/response.

Setting the BROADCAST field value to "221" may be used if the broadcast service capability in the WLAN is a proprietary broadcast service specific to the WLAN.

In alternative examples, the BROADCAST field 508 can be formatted as a mask including multiple bits, where each bit can indicate whether the respective broadcast capability in each corresponding row of Table 1 is supported or not. More specifically, the mask can have a first bit that if set to an active value indicates the broadcast capability corresponding to value "0" in Table 1, a second bit that if set to an active value indicates the broadcast capability corresponding to value "1" in Table 1, and so forth.

The use of the mask has the benefit of being able to signal that a source wireless device has many broadcast streams (e.g., the third bit of the mask set active), but is currently not broadcasting (e.g., the first bit of the mask set inactive). A receiving wireless device receiving the above mask can then trigger or prompt the source wireless device to start broadcasting using the trigger indication sent at 302 in FIG. 3.

The BROADCAST CHANNEL duple(s) 510 contain(s) zero or more variable length BROADCAST CHANNEL duple(s) 510. An example format of a BROADCAST CHANNEL duple 510 is shown in FIG. 6. As shown in FIG. 6, the BROADCAST CHANNEL duple 510 includes a TOTAL LENGTH field 602, an optional BROADCAST STREAM INFORMATION field 604, an optional TIME LENGTH field 606, and an optional TIME INFORMATION field 608. Example sizes (in octets) of the respective fields are also indicated in FIG. 6.

The TOTAL LENGTH field 602 is set to a value representing the length of the BROADCAST STREAM INFORMATION field 604, the TIME LENGTH field 606, and the TIME INFORMATION field 608.

If the BROADCAST field 508 of FIG. 5 is set to "2," the BROADCAST STREAM INFORMATION field 604 is used to identify a source of the broadcast stream information (e.g., as a channel number, an orthogonal frequency-division multiple access (OFDMA) sub-channel or uniform resource locator (URL), etc.).

In further examples, the BROADCAST STREAM INFORMATION field 604 can also include one or more of: a source Medium Access Control (MAC) address for a broadcast stream, a destination (multicast/broadcast) MAC address for a broadcast stream, TSPEC/TCLAS information; a source Internet Protocol (IP) address (IPv4 or IPv6) and port; a destination IP address (IPv4 or IPv6) and port; a broadcast stream uniform resource identifier (URI), a broadcast stream service hash, and so forth.

Alternatively, the broadcast stream can be advertised as a service and can be discovered as a service hash using IEEE 802.11 Service Discovery procedures. The broadcast stream information can be indexed using the service hash.

The TIME LENGTH field 606 is set to a value representing the length of the TIME INFORMATION field 608. If the TIME INFORMATION field 608 is not used, the TIME LENGTH field 606 is also not used.

The TIME INFORMATION field 608 contains timing information about when the broadcast stream (indicated by the BROADCAST STREAM INFORMATION field 604) is available, in terms of real time, duration and whether the broadcast stream repeats. If the TIME INFORMATION field 608 is not present, then the receiving wireless device 204 can assume that the broadcast stream is always available (subject to the source wireless device 204 deciding whether or not to transmit, such as based on WLAN loading).

In some examples, a first device can transmit a Broadcast Capability ANQP-element 502 request to a second device, and then the second device can respond with a Broadcast Capability ANQP-element 502 response containing the requested information, if the second device supports the broadcast service capability.

Broadcast Switching ANQP-Element

Figure 7:
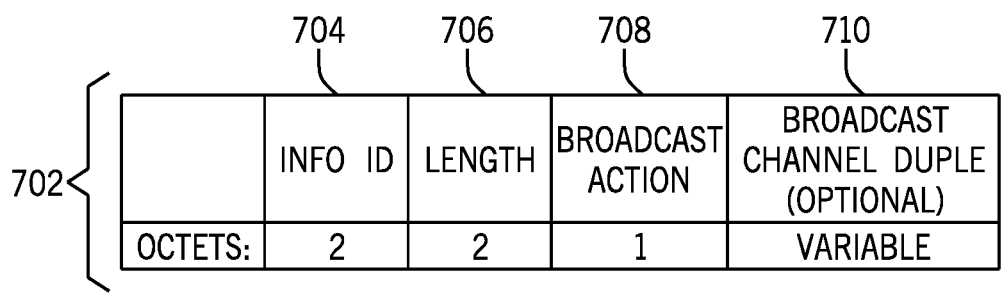

An example Broadcast Switching ANQP-element 702 is shown in FIG. 7. The Broadcast Switching ANQP-element 702 can be used to implement the indications or messages sent at 302 and 306 in FIG. 3.

The Broadcast Switching ANQP-element 702 includes an INFO ID field 704, a LENGTH field 706, a BROADCAST ACTION field 708, and optional BROADCAST CHANNEL duple(s) 710. Example sizes (in octets) of the respective fields are also indicated in FIG. 7.

The INFO ID field 704 is set to a value indicating that the ANQP-element 702 is a Broadcast Switching ANQP-element.

The LENGTH field 706 and BROADCAST CHANNEL duple(s) 710 are similar to the LENGTH field 506 and BROADCAST CHANNEL duple(s) 510 of FIG. 5.

The BROADCAST ACTION field 708 is set to any of various values to advertise respective different information. Examples of such values and what they represent are shown below in Table 2.

TABLE 2

| BROADCAST ACTION field value | Description of Broadcast Action |
|---|---|
| 0 | Success |
| 1 | Failure |

TABLE 2-continued

| BROADCAST ACTION field value | Description of Broadcast Action |
|---|---|
| 2 | Switch on Broadcast functionality |
| 3 | Switch off Broadcast functionality |
| 4 | Switch on Broadcast Channel as indicated in the Broadcast Channel Duple |
| 5 | Switch off Broadcast Channel as indicated in the Broadcast Channel Duple |
| 6-220 | Reserved |
| 221 | Vendor Specific Broadcast Service |
| 222-256 | Reserved |

In some examples, a first device can transmit a Broadcast Switching ANQP-element 702 request to a second device, with the BROADCAST ACTION field 708 set for the requested action (e.g., values 2-5). In response, the second device can respond with a Broadcast Switching ANQP-element 702 response containing the requested information (e.g., values 0 or 1 indicating success or failure).

Setting the BROADCAST ACTION field value to "221" may be used if the broadcast action in the WLAN is a proprietary broadcast action specific to the WLAN.

Broadcast Capability Element

FIGS. 5-7 show examples where ANQP-elements are used to transmit information relating to broadcast services.

In other examples, the same or similar information can be included in a beacon or a Probe response.

Figure 8:
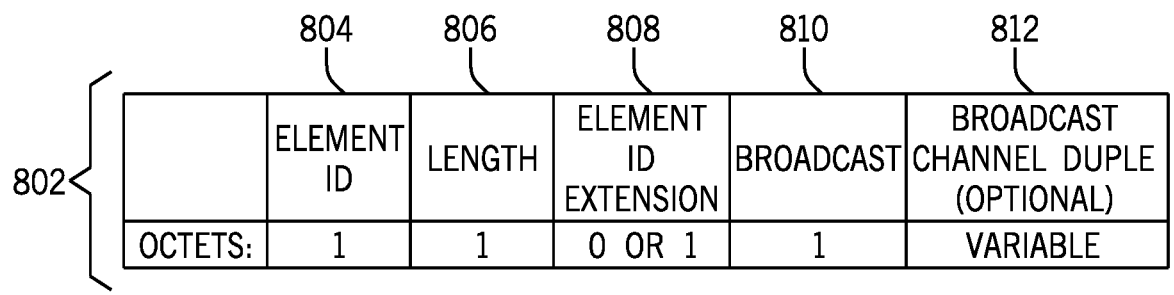

A Broadcast Capability element 802 (used to implement the indications or messages sent at 206, 208, or 210 in FIG. 2) that can be included in a beacon or a Probe response is shown in FIG. 8. The Broadcast Capability element 802 includes an ELEMENT ID field 804, a LENGTH field 806, an ELEMENT ID EXTENSION field 808, a BROADCAST field 810, and an optional BROADCAST CHANNEL duple 812. Example sizes (in octets) of the respective fields are also indicated in FIG. 8.

The ELEMENT ID field 804, the LENGTH field 806, and the ELEMENT ID EXTENSION field 808 are described in the IEEE 802.11-2016 Specification.

The BROADCAST field 810 and the BROADCAST CHANNEL duple 812 are similar to the BROADCAST field 508 and the BROADCAST CHANNEL duple(s) 510 of FIG. 5.

In some examples, a first device can transmit a Broadcast Capability element in a Probe request to a second device, and then the second device can respond with a Probe response containing the requested information, if the second device supports a broadcast service capability.

Alternatively, the first device can transmit a Broadcast Capability element in a Beacon to all devices within reception range, without any trigger message or prompting. The first device may decide not to transmit this information in every beacon. Similarly, the first device may decide to transmit the information in Probe responses to all devices, perhaps following a Probe request or an ANQP request from another device that is interested in a broadcast service.

Broadcast Switching Element

Figure 9:
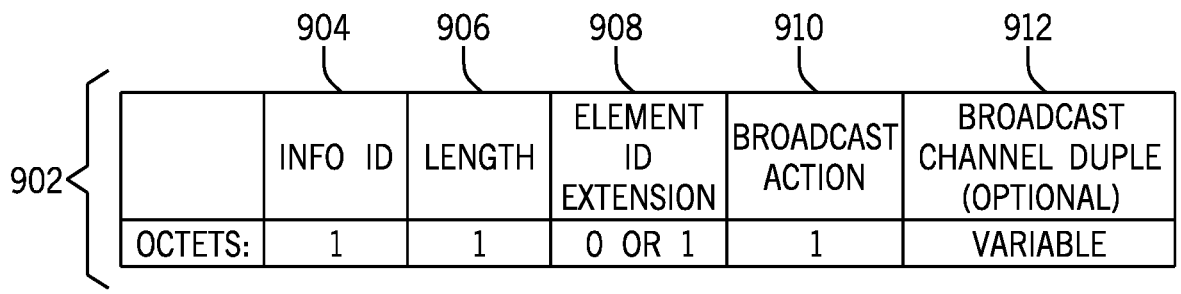

FIG. 9 shows a Broadcast Switching element 902 used to implement indications or messages sent at 302 or 306 in FIG. 3. The Broadcast Switching element 902 can be included in a beacon or a Probe response. The Broadcast Switching element 902 includes an ELEMENT ID field 904, a LENGTH field 906, an ELEMENT ID EXTENSION field 908, a BROADCAST ACTION field 910, and an optional BROADCAST CHANNEL duple 912. Example sizes (in octets) of the respective fields are also indicated in FIG. 8.

The ELEMENT ID field 904, the LENGTH field 906, and the ELEMENT ID EXTENSION field 908 are described in the IEEE 802.11-2016 Specification.

The BROADCAST ACTION field 910, and an optional BROADCAST CHANNEL duple 912 are similar to the BROADCAST ACTION field 708, and a BROADCAST CHANNEL duple 710 of FIG. 7.

In some examples, a first device can transmit a Broadcast Switching element 902 in a Probe request to a second device, and then the second device can respond with a Probe response containing the requested information.

Device Architecture

Figure 10:
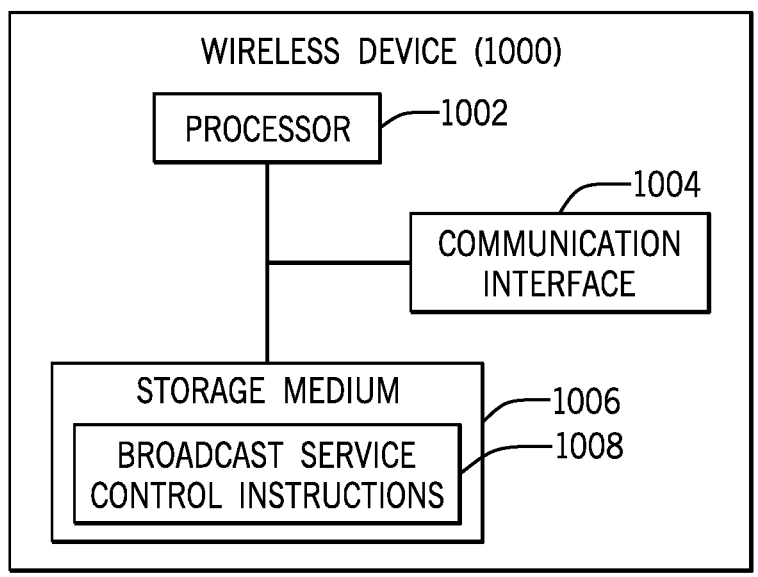
FIG. 10 is a block diagram of a wireless device according to some implementations.

FIG. 10 is a block diagram of a wireless device 1000 (e.g., an endpoint device, an AP, or another type of device). The wireless device 1000 includes a processor 1002 (or multiple processors). A processor can include a microprocessor, a core of a multi-core microprocessor, a microcontroller, a programmable integrated circuit, a programmable gate array, or another hardware processing circuit.

The wireless device 1000 includes a wireless communication interface 1004 that can perform wireless communications over a wireless medium, such as a WLAN. The communication interface 1004 includes a transceiver (including a transmitter and receiver, such as a radio-frequency transmitter and receiver) and protocol layers used to implement communication protocols.

The wireless device 1000 further includes a non-transitory machine-readable or computer-readable storage medium 1006 that stores machine-readable instructions executable on the processor 1002 to perform respective tasks. The machine-readable instructions include broadcast service control instructions 1008 to perform various broadcast service related tasks as discussed above.

Machine-readable instructions executable on a processor can refer to the instructions executable on a single processor or the instructions executable on multiple processors.

The storage medium 1006 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
sending, by a source wireless device, an indication of support for one or more broadcast services that broadcast information over a wireless local area network (WLAN);
receiving, by the source wireless device from a receiving wireless device over the WLAN, a stop indication to stop a given broadcast service of the one or more broadcast services; and
in response to the stop indication, determining, by the source wireless device, to stop the given broadcast service responsive to the source wireless device determining that there are a predetermined number of receiving wireless devices receiving the given broadcast service after satisfying the stop indication.

2. The method of claim 1, further comprising:
sending, by the source wireless device, time information relating to a time duration of transmission of a further broadcast service of the one or more broadcast services.

3. The method of claim 2, further comprising:
receiving, by the source wireless device from the receiving wireless device, an indication to continue transmission of the further broadcast service past the time duration.

4. The method of claim 1, wherein the predetermined number is zero, and the determining to stop the given broadcast service is responsive to the source wireless device determining that there are zero receiving wireless devices receiving the given broadcast service after satisfying the stop indication.

5. The method of claim 1, wherein the one or more broadcast services perform multicasting of information.

6. The method of claim 1, wherein sending the indication of support comprises sending the indication of support in a beacon.

7. The method of claim 1, wherein sending the indication of support comprises sending the indication of support in a response to a request from another device.

8. The method of claim 7, wherein the response comprises a Probe response or an Access Network Query Protocol (ANQP) response.

9. The method of claim 1, further comprising:
sending, by the source wireless device, further information relating to a broadcast stream of the one or more broadcast services.

10. The method of claim 9, further comprising:
receiving, by the source wireless device from a requesting device, a request for further information about the one or more broadcast services,
wherein the sending of the further information is in response to the request.

11. The method of claim 9, wherein the further information comprises one or more selected from among information of a channel, a sub-channel or a sub-carrier of a broadcast stream, information of a location of the broadcast stream, information of a time of availability of the broadcast stream, and security information relating to the broadcast stream.

12. The method of claim 1, further comprising:
receiving, by the source wireless device from a requesting device, a trigger indication to start the one or more broadcast services; and
in response to the trigger indication, start the one or more broadcast services.

13. The method of claim 12, further comprising:
receiving, by the source wireless device from the requesting device, at least one identifier of at least one broadcast stream of a plurality of broadcast streams, and
wherein starting the one or more broadcast services comprises transmitting the at least one broadcast stream responsive to the at least one identifier.

14. The method of claim 1, further comprising:
determining, by the source wireless device based on one or more factors, whether to use a broadcast stream of the one or more broadcast services or a unicast stream to deliver information to one or more receiving wireless devices.

15. The method of claim 14, wherein the one or more factors are selected from among a number of receiving devices in a range of the source wireless device, a number of receiving devices that have requested the one or more broadcast services, and a capability of a communication backhaul link of the source wireless device.

16. A source wireless device comprising:
a wireless interface to communicate over a wireless local area network (WLAN);
at least one processor; and
a non-transitory storage medium storing instructions executable on the at least one processor to:
send an indication of support for a broadcast service that broadcasts information over the WLAN,
receive, from a receiving wireless device over the WLAN, a stop indication to stop the broadcast service, and
in response to the stop indication, determine to stop the broadcast service responsive to the source wireless device determining that there are a predetermined number of receiving wireless devices receiving the broadcast service after satisfying the stop indication.

17. The source wireless device of claim 16, wherein the instructions are executable on the at least one processor to receive, from another receiving wireless device, a control indication to control transmission of a broadcast stream of the broadcast service.

18. A receiving wireless device comprising:
a wireless interface to communicate over a wireless local area network (WLAN) with a source wireless device;
at least one processor; and
a non-transitory storage medium storing instructions executable on the at least one processor to:
receive, at the receiving wireless device from the source wireless device that comprises a vehicle or a roadside unit, an indication of support for a vehicular broadcast service, the vehicular broadcast service to broadcast information from the source wireless device over the WLAN, and
send from the receiving wireless device, over the WLAN to the source wireless device that communicates wirelessly on the WLAN, a stop indication to cause the source wireless device to stop the vehicular broadcast service based on a determination at the source wireless device that there are a predetermined number of receiving wireless devices receiving the broadcast service after satisfying the stop indication.

19. The receiving wireless device of claim 18, wherein the instructions are executable on the at least one processor to send, to the source wireless device, a control indication to control transmission of a broadcast stream of the vehicular broadcast service.

\* \* \* \* \*